US008434009B2

(12) United States Patent
Fuse et al.

(10) Patent No.: US 8,434,009 B2
(45) Date of Patent: Apr. 30, 2013

(54) INFORMATION PROCESSING APPARATUS AND COMPUTER READABLE MEDIUM

(75) Inventors: Tohru Fuse, Tokyo (JP); Zhihua Zhong, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 815 days.

(21) Appl. No.: 12/141,525

(22) Filed: Jun. 18, 2008

(65) Prior Publication Data

US 2009/0100350 A1 Apr. 16, 2009

(30) Foreign Application Priority Data

Oct. 16, 2007 (JP) ................................. 2007-269376

(51) Int. Cl.
*G06F 3/00* (2006.01)
(52) U.S. Cl.
USPC ........... 715/753; 715/751; 715/730; 715/764; 709/204; 709/205; 709/224; 709/248
(58) Field of Classification Search ................... 715/753
See application file for complete search history.

(56) References Cited

U.S. PATENT DOCUMENTS

| 5,920,694 | A * | 7/1999 | Carleton et al. ............. 709/205 |
| 6,266,691 | B1 * | 7/2001 | Watanabe et al. ............. 709/204 |
| 6,600,725 | B1 * | 7/2003 | Roy ............................. 370/261 |
| 6,601,087 | B1 * | 7/2003 | Zhu et al. ...................... 709/205 |
| 7,783,700 | B2 * | 8/2010 | Kawazoe et al. ............. 709/203 |
| 7,859,483 | B2 * | 12/2010 | Ueno et al. .................... 345/1.1 |
| 2005/0034079 | A1 * | 2/2005 | Gunasekar et al. ........... 715/753 |
| 2006/0066717 | A1 * | 3/2006 | Miceli ......................... 348/14.09 |
| 2006/0080432 | A1 * | 4/2006 | Spataro et al. ................ 709/224 |
| 2006/0136828 | A1 * | 6/2006 | Asano .......................... 715/733 |
| 2006/0291014 | A1 * | 12/2006 | Hirata et al. .................. 358/504 |
| 2007/0035614 | A1 * | 2/2007 | Tamaru et al. ............. 348/14.08 |
| 2007/0064705 | A1 * | 3/2007 | Tateno et al. ................ 370/394 |
| 2007/0124682 | A1 * | 5/2007 | Fukeda et al. ............... 715/730 |
| 2007/0198744 | A1 * | 8/2007 | Wensley et al. .............. 709/248 |
| 2007/0200921 | A1 * | 8/2007 | Horikiri ...................... 348/14.08 |
| 2007/0200922 | A1 * | 8/2007 | Ueno et al. ................. 348/14.08 |
| 2007/0219981 | A1 * | 9/2007 | Takaai et al. ..................... 707/5 |
| 2008/0068346 | A1 * | 3/2008 | Naganawa ................... 345/173 |

(Continued)

FOREIGN PATENT DOCUMENTS

| EP | 0 349 463 A2 | 1/1990 |
| JP | A-09-258948 | 10/1997 |
| JP | A-2004-13318 | 1/2004 |
| JP | A-2006-164177 | 6/2006 |

OTHER PUBLICATIONS

Australian Office Action issued in Australian Patent Application No. 2008202939 on Mar. 10, 2010.

(Continued)

*Primary Examiner* — William Bashore
*Assistant Examiner* — Reza Nabi
(74) *Attorney, Agent, or Firm* — Oliff & Berridge, PLC (57) ABSTRACT

An information processing apparatus includes: an image acquirement unit that acquires an image displayed on a first screen; a change determining unit that determines change of a first object displayed on the first screen; an object acquirement unit that acquires a second object displayed on a second screen superposed and displayed on the first screen; a change unit that changes, on the basis of the change of the first object determined by the change determining unit, the second object acquired by the object acquirement unit; and a transmission unit that transmits the image acquired by the image acquirement unit and the change result by the change unit to another information processing apparatus.

7 Claims, 11 Drawing Sheets

U.S. PATENT DOCUMENTS

| | | | |
|---|---|---|---|
| 2008/0133736 A1* | 6/2008 | Wensley et al. | 709/224 |
| 2008/0209328 A1* | 8/2008 | Parkinson | 715/733 |
| 2008/0301228 A1* | 12/2008 | Flavin | 709/204 |
| 2009/0125586 A1* | 5/2009 | Sato et al. | 709/203 |
| 2010/0241972 A1* | 9/2010 | Spataro et al. | 715/753 |
| 2010/0253697 A1* | 10/2010 | Rivera | 345/589 |
| 2011/0047485 A1* | 2/2011 | Takakura | 715/753 |

OTHER PUBLICATIONS

Japanese Office Action issued in Japanese Patent Application No. 2007-269376 on Jan. 19, 2010 (with translation).

Chinese Office Action issued in Chinese Patent Application No. 200810132388.5 on May 11, 2010 (with translation).

* cited by examiner

INFORMATION PROCESSING APPARATUS AND COMPUTER READABLE MEDIUM

CROSS-REFERENCE TO RELATED APPLICATIONS

This application is based on and claims priority under 35 U.S.C. 119 from Japanese Patent Application No. 2007-269376 filed Oct. 16, 2007.

BACKGROUND

1. Technical Field

The present invention relates to an information processing apparatus and a computer readable medium.

2. Related Art

It is demanded that plural information processing devices which are in remote locations are connected via a communication line so as to share their screens in a conference system, and add and edit an object such as a character or a graphic on the sharing screens.

SUMMARY

According to an aspect of the present invention, an information processing apparatus includes: an image acquirement unit that acquires an image displayed on a first screen; a change determining unit that determines change of a first object displayed on the first screen; an object acquirement unit that acquires a second object displayed on a second screen superposed and displayed on the first screen; a change unit that changes, on the basis of the change of the first object determined by the change determining unit, the second object acquired by the object acquirement unit; and a transmission unit that transmits the image acquired by the image acquirement unit and the change result by the change unit to another information processing apparatus.

BRIEF DESCRIPTION OF THE DRAWINGS

Exemplary embodiment of the present invention will be described in detail based on the following figures, wherein.

DETAILED DESCRIPTION

With reference to drawings, a preferred embodiment for realizing the invention will be described below.

Figure 1:
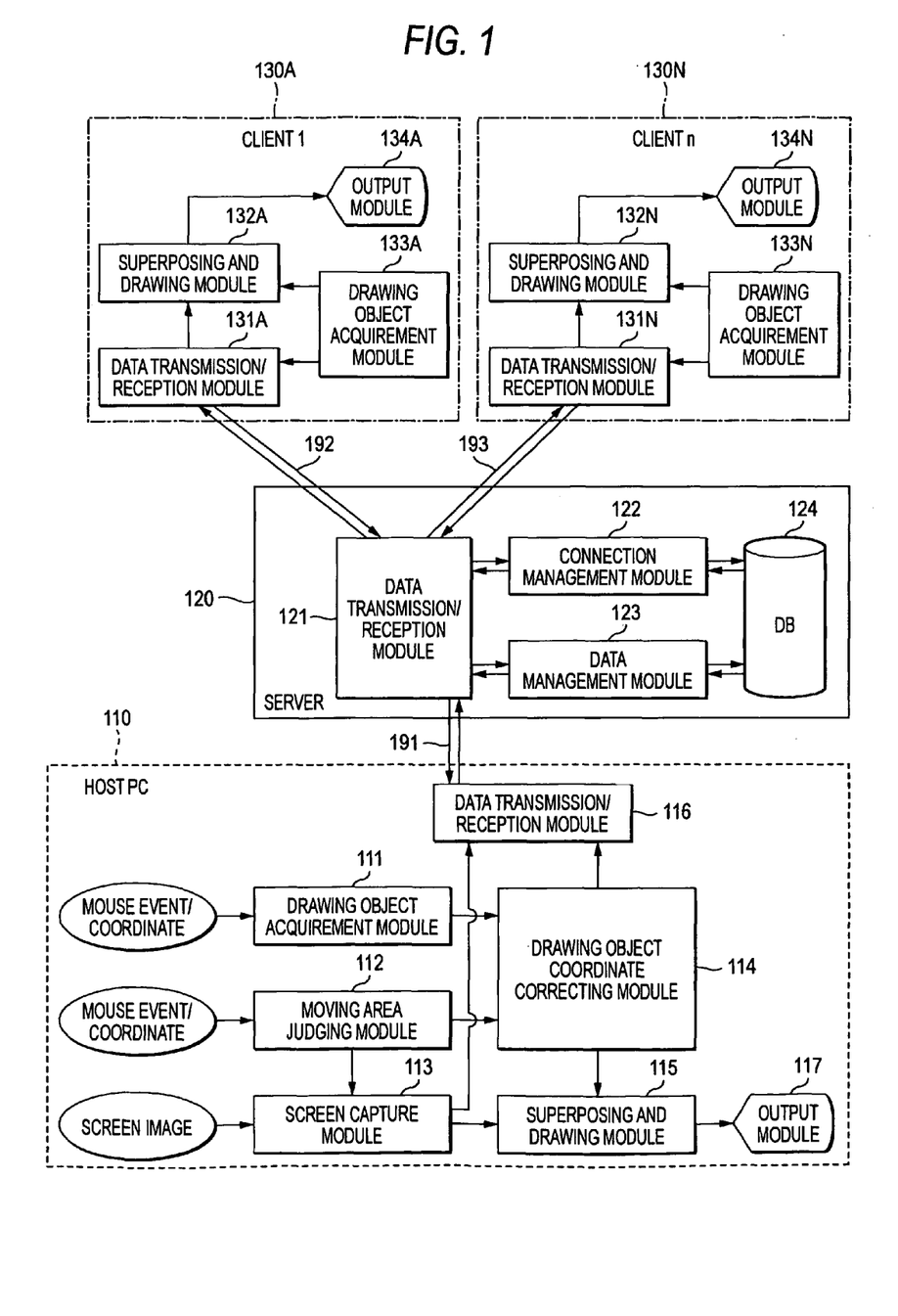
FIG. 1 is a conceptual module configuration diagram relating to a configuration example in an embodiment of the invention.

FIG. 1 shows a conceptual module configuration diagram of a configuration example in the embodiment.

The module generally means software that is logically separable (computer program), and hardware parts. Accordingly, the module in the embodiment means not only a module in a computer program but also a module in hardware configuration. Therefore, the embodiment describes a computer program, a system and also a method. Though "store", "let~store", and a word equivalent to these words are used for convenience of description, these words mean, in case that the embodiment is the computer program, "to let a storage device store" or "to perform such control as to let a storage device store". Further, a module corresponds to a function in nearly one-to-one relation. Regarding mounting, one module may be configured by one program, plural modules may be configured by one program, and to the contrary, one module may be configured by plural programs. Further, the plural nodules may be executed by one computer, or one module may be executed by plural computers arranged in distribution environment or in parallel environment. Further, another module may be included in one module. Furthermore, "connection" includes physical connection and also logical connection (data delivery and reception, instruction, and reference relation between data).

Further, a system or an apparatus is configured by plural computers, hardware, a device, or the like which are connected by communication means such as a network (including one-to-one communication connection), or can be also implemented by one computer, hardware, a device, or the like.

The information processing apparatus and information processing program in the embodiment are used in a conference, and the apparatus includes a host PC 110, a server 120, a client 130A, and the like as shown in FIG. 1. The host PC 110 is connected via a communication line 191 to the server 120, and the server 120 is connected via communication lines 192 and 193 to clients 130A and 130N. Further, the number of clients may be one, or two and more.

Further, though the embodiment will be described with reference to a first screen, a second screen, and a third screen, these screens will be described later with reference to FIG. 3. In case of explanation of the host PC 110, the first screen indicates a first screen on the host PC 110; and in case of explanation of the client 130, the first screen indicates a first screen on the client 130.

Change of an object includes movement of an object, enlargement or reduction thereof, deformation thereof, deletion thereof, and the like. Here, the movement of the object will be mainly described. Further, hereinafter, an object to be operated is referred to as an object.

The host PC 110 includes a drawing object acquirement module 111, a moving area determining module 112, a screen capture module 113, a drawing object coordinate correcting module 114, a module for superimposition drawing 115, a data transmission/reception module 116, and an output module 117. The host PC 110 is a PC which a host of a conference mainly uses.

The moving area determining module 112 is connected to the screen capture module 113 and the drawing object coordinate correcting module 114, receives a mouse event (click of a mouse button or the like) or coordinates of a mouse cursor in the mouse event occurrence time in accordance with operator's operation, and determines movement of a first object displayed on a first screen. Next, the moving area determining module 112 delivers its determination result to the screen capture module 113 and the drawing object coordinate correcting module 114.

The drawing object acquirement module 111 is connected to the drawing object coordinate correcting module 114, receives a mouse event or coordinates of the mouse cursor in the mouse event occurrence time in accordance with operator's operation, and acquires a second object to be displayed on a second screen displayed in a superposed state on the first screen. Next, the drawing object acquirement module 111 delivers the acquired second object to the drawing object coordinate correcting module 114. Based on the distance from the first object to be determined by the moving area determining module 112, a second object associated with the first object may be acquired.

The screen capture module 113 is connected to the moving area determining module 112, the module for superimposition drawing 115, and the data transmission/reception module 116, and captures an image (screen image) displayed on the first screen. Here, to capture is to acquire a moving image and a static image displayed on the display as digital image, and referred to also as screen shot. The screen capture module 113 delivers the captured image to the module for superimposition drawing 115, and the data transmission/reception module 116.

The drawing object coordinate correcting module 114 is connected to the drawing object acquirement module 111, the moving area determining module 112, the module for superimposition drawing 115, and the data transmission/reception module 116. On the basis of the movement of the first object determined by the moving area determining module 112, the drawing object coordinate correcting module 114 corrects coordinates of the second object acquired by the drawing object acquirement module 111 thereby to move the second object. Next, the drawing object coordinate correcting module 114 delivers the movement result to the data transmission/reception module 116 and the module for superimposition drawing 115.

The module for superimposition drawing 115 is connected to the screen capture module 113, the drawing object coordinate correcting module 114, and the output module 117. The module for superimposition drawing 115 superposes (ORs) the second screen where the second object moved by the drawing object coordinate correcting module 114 exists on (with) the image (image on the first screen) captured by the screen capture module 113, thereby to perform drawing; and delivers its image to the output module 117. Further, the module for superimposition drawing 115 superposes the movement result of the object to be displayed on the second screen, which has been received by the data transmission/reception module 116 on the image captured by the screen capture module 113, thereby to perform drawing; and delivers its image to the output module 117.

The data transmission/reception module 116 is connected to the screen capture module 113 and the drawing object coordinate correcting module 114, and connected via the communication line 191 to the data transmission/reception module 121 of the server 120. The data transmission/reception module 116 sends the image acquired by the screen capture module 113 and the movement result (the image itself on the second screen, or the moving direction and the moving amount of the object displayed on the second screen) by the drawing object coordinate correcting module 114 to the clients 130A and 130N via the server 120. Further, the data transmission/reception module 116 receives a movement result of an object to be displayed on the second screen, which comes being sent from the clients 130A and 130N via the server 120.

The output module 117 receives an image from the module for superimposition drawing 115, and displays its image on a CRT or a liquid crystal screen of the host PC 110.

The server 120 includes the data transmission/reception module 121, a connection management module 122, a data management module 123, and a DB 124. In a conference system, the server 120 connects the host PC 110, the client 130A, and the client 130N, and controls data transmitter, destination of data distribution, and contents of data.

The data transmission/reception module 121 is connected to the connection management module 122 and the data management module 123, connected to the data transmission/reception module 116 of the host PC 110 via the communication line 192, connected to a data transmission/reception module 131A of the client 130A via the communication line 192, and connected to a data transmission/reception module 131N of the client 130N via the communication line 193. Namely, the data transmission/reception module 121 connects the host PC 110, the client 130A, and the client 130N.

The connection management module 122 is connected to the data transmission/reception module 121 and the DB 124. The connection management module 122 gives such an instruction to the data transmission/reception module 121 as to send the data received by the data transmission/reception module 121 to a destination of distribution (host PC 110, clients 130A and 130N) previously registered in the DB 124.

The data management module 123 is connected to the data transmission/reception module 121 and the DB 124. The data management module 123 lets the DB 124 store the data received by the data transmission/reception module 121 as historical data in the conference. Further, the data management module 123 may give an instruction to the data transmission/reception module 121 so as to transmit its historical data in accordance with a request from the host PC 110 which creates the minutes of the conference.

The DB 124 is connected to the connection management module 122 and the data management module 123, and stores management data such as which conference is to be performed in combination of which devices (host PC 110, and clients 130A and 130N), and data transmitted and received between the respective devices as the historical data.

The client 130A includes the data transmission/reception module 131A, a module for superimposition drawing 132A, a drawing object acquirement module 133A, and an output module 134A. The client 130A is, for example, a PC used by a participant of its conference. The client 130N has a similar configuration to that of the client 130A, including a data transmission/reception module 131N, a module for superimposition drawing 132N, a drawing object acquirement module 133N, and an output module 134N.

The data transmission/reception module 131A is connected to the module for superimposition drawing 132A and the drawing object acquirement module 133A, and also connected to the data transmission/reception module 121 of the server 120 via the communication line 192. The data transmission/reception module 131A receives, through the server 120, the image and the movement result of the object from the host PC 110. Thereafter, the data transmission/reception module 131A sends the received contents to the module for superimposition drawing 132A. In case that the object acquired by the drawing object acquirement module 133A is moved, the data transmission/reception module 131A sends information on the moved object to the host PC 110 via the server 120.

The module for superimposition drawing 132A is connected to the data transmission/reception module 131A, the drawing object acquirement module 133A, and the output module 134A, and draws the image received by the data transmission/reception module 131A on the first screen. Thereafter, on the basis of the movement result of the object received by data transmission/reception module 131A, the module for superimposition drawing 132A draws an image on the second screen. Alternatively, upon reception of the movement result of the object in the second screen from the drawing object acquirement module 133A, the module for superimposition drawing 132A draws an image on the second screen. Further, the module for superimposition drawing 132A superposes the first screen and the second screen to draw an image, and delivers its image to the output module 134A.

The drawing object acquirement module 133A is connected to the data transmission/reception module 131A and the module for superimposition drawing 132A. The drawing object acquirement module 133A, in accordance with operator's operation, receives a mouse event or coordinates of a mouse cursor when its mouse event occurs, and acquires the second object displayed on the second screen.

The output module 134A is connected to the module for superimposition drawing 132A. The output module 134A receives the image from the module for superimposition drawing 132A, and displays its image on a CRT or a liquid crystal screen of the client 130A.

Figure 2:
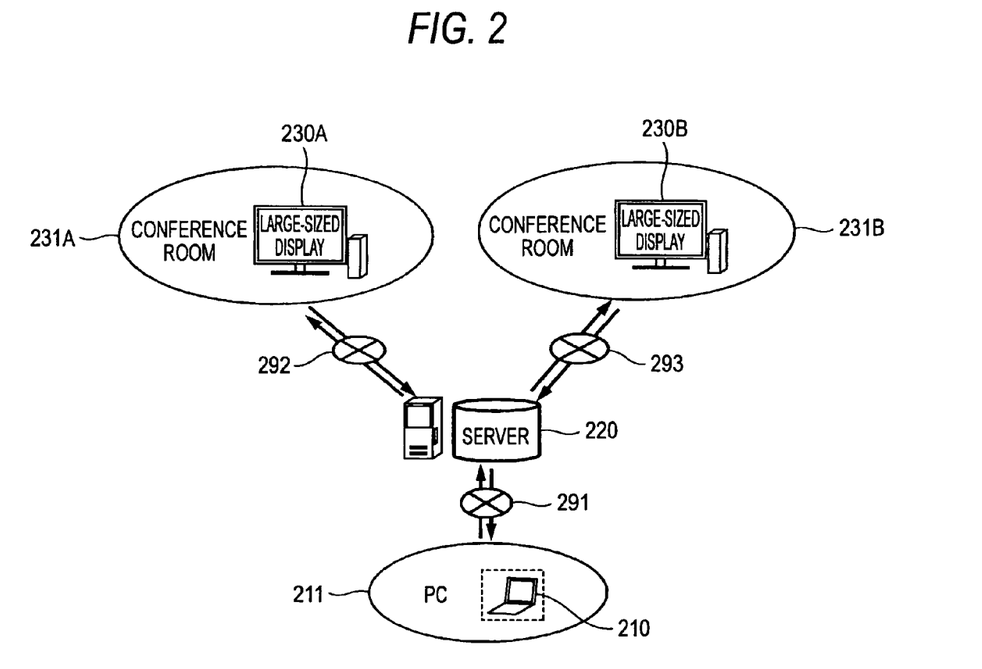
FIG. 2 is an explanatory diagram showing a system configuration example for implementing the embodiment.

Referring to FIG. 2, a configuration example of a system when the embodiment is implemented will be described. This system includes a PC 210 in a conference room 211, a client 230A in a conference room 231A, a client 230B in a conference room 231B, and a server 220 which connects these devices through respective networks 291, 292, and 253. The PC 210 corresponds to the host PC 110 shown in FIG. 1, the server 220 corresponds to 120 shown in FIG. 1, the client 230A corresponds to the client 130A shown in FIG. 1, and the client 230B corresponds to the client 130N shown in FIG. 1.

Working and operation in this system configuration example will be described.

Firstly, a desktop that is a first screen of the PC 210 is screen-captured, and next transmitted to the clients 230A and 230B via the server 20.

An object drawn on a second screen on the PC 210 is drawn on a second screen of the client 230A or the like so as to be located in the relatively same position as on-desktop of the PC 210. Namely, the desktop screen of the PC 210 is shared with each client 230A, 230B, so that their three persons look at the same desktop screen.

To the contrary, an object drawn on the second screen of the client 230A or the like is drawn on the second screen of the PC 210 so as to be located in the same position as the on-desktop of the PC 210. Hereby, the drawing object is symmetrically shared between the client 230A or the like and the PC 210.

On the other hand, though the client 230A or the like always shares the screen of the PC 210, it does not transmit its desktop screen to the PC 210. Therefore, the desktop screen is asymmetrically shared between the client 230A or the like and the PC 210.

The object drawn on the second screen of the client 230A is drawn on the second screen of the PC 210. On the PC 210, in case that a drawing instruction is given by operation of a drawing instruction area (drawing tool) that a third screen of the PC 210 includes, a mouse event is delivered to an application program displayed on the second screen. By changing a pixel value on coordinates which have received a drawing instruction by the mouse event generated on the second screen to a specified value, an object can be drawn. For example, by changing a pixel value showing colorlessness before drawing to a pixel value showing red color, a red dot can be drawn.

On the other hand, the client 230A does not include a third screen. Therefore, the mouse event is always delivered to the second screen. However, in order to give an instruction to an application program that generates the second screen, a drawing instruction area for receiving operator's operation is displayed on the second screen. Display of its drawing instruction area may be switched to non-display.

When an object is drawn by the mouse event on the PC 210, combination data of coordinates of pixels forming its object and its pixel value is transmitted as drawing object data to the server 220. The server 220 which has received its data transmits its data to the client 230A that is a destination of distribution previously registered. The client 230A which has received the data from the server 220, in accordance with its data, changes the pixel on the second screen of the client 230A to the specified value so that the pixel is in the relatively same position as the desktop of the PC 210. Hereby, the drawing object is drawn.

When an object is drawn on the second screen of the client 230A by the mouse event of the client 230A, combination data of coordinates of pixels forming its object and its pixel value is transmitted as drawing object data to the server 220.

The server 220 which has received its data transmits its data to the PC 210 previously registered.

The PC 210 which has received the data from the server 220, in accordance with its data, changes the pixel on the second screen of the PC 210 to the specified value, whereby, the drawing object is drawn.

Figure 3:
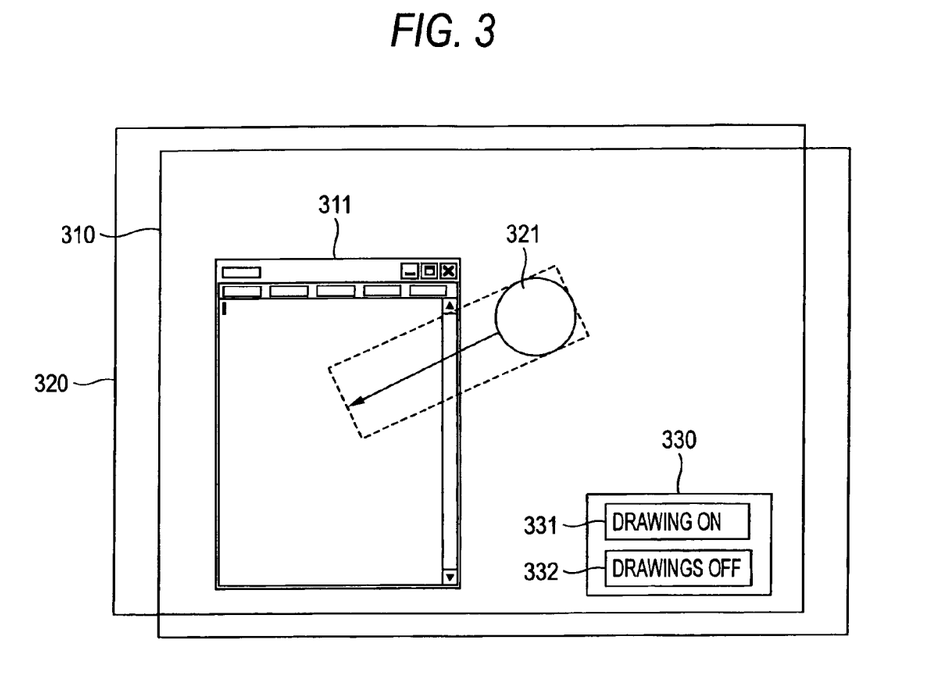
FIG. 3 is an explanatory diagram showing a relation among a first screen, a second screen, and a third screen.

Referring to FIG. 3, relation among a first screen 310, a second screen 320, and a third screen 330 will be described.

The screen of the host PC 110 is formed by superposition of the first screen 310, the second screen 320, and the third screen 330.

On the first screen 310, an object group managed by OS (Operating System), that is, an application window 311 displayed when an application program operates, and an icon, a folder, or a document file for referring to the application program are drawn. Since the first screen 310 is a screen for drawing the object group by the OS, it indicates usually a screen referred to as a desktop.

The second screen 320 has a transparent background. Accordingly, when the second screen 320 is superposed on the first screen 310, an object 321 drawn on the second screen 320 is seen so as to be drawn directly on the object group (application window 311) managed by the OS.

On the third screen 330, a drawing instruction area is arranged. The drawing instruction area includes at least a drawing ON button 331 and a drawing OFF button 332 for giving an instruction of a drawing mode or a non-drawing mode from the operator. Further, the drawing ON button 331 and the drawing OFF button 332, as long as they can indicate a binary state showing whether a drawing function is applied or not, may be represented by any graphics or characters, such as buttons, switches, sliders, check boxes, and ON/OFF of a pen. Further, the drawing ON button 331 and the drawing OFF button 332 may be switched to any key arranged on a keyboard or shortcut.

The third screen 330 is always superposed on the top of the first screen 310 and the second screen 320 (namely, superposed so as to enable always display). To the drawing instruction area, a color specifying tool, a pen thickness tool, a pen kind tool, and the like can be added according to specifications of a drawing application program.

In case that the drawing function is applied by pushing on the drawing ON button 331 on the third screen 330, the mouse event is delivered to an application program which is controlling the second screen 320. In case that the drawing function not be applied by pushing on the drawing OFF button 332 on the third screen 330, the mouse event is delivered to the OS or the application program which is controlling the first screen 310.

With reference to a flowchart shown in FIG. 4, a processing example in the embodiment will be described.

First, examples to which this flowchart is applied will be described with reference to FIGS. 6 to 8.

Figure 6:
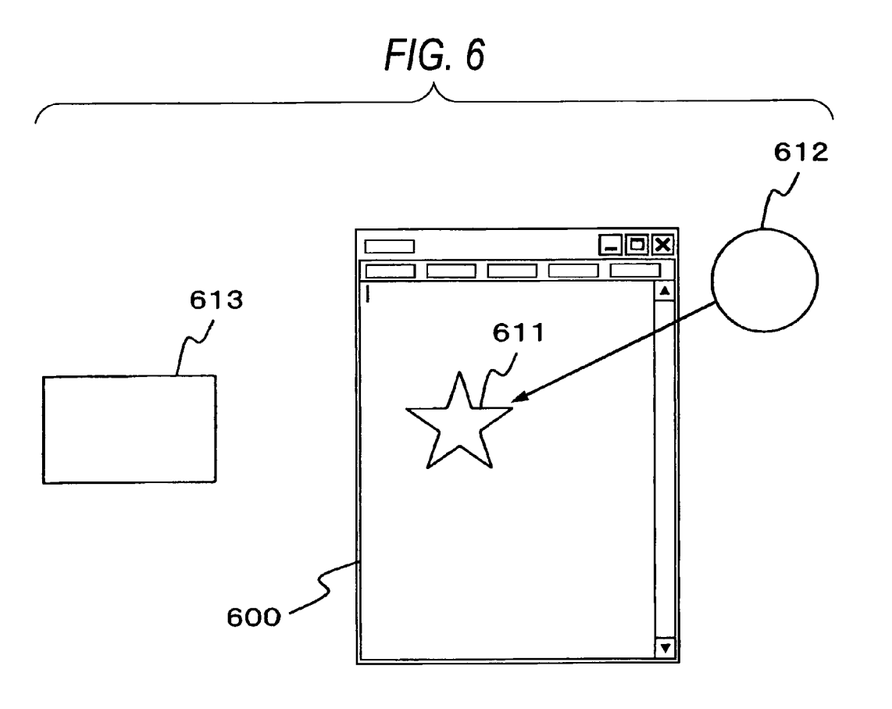
FIG. 6 is an explanatory diagram showing a processing example in the embodiment.

As shown in FIG. 6, in the output module 117 of the host PC 110, an application window 600 which the OS manages in the first screen 310 (desktop), and an object 611 in the application window 600 are drawn, and objects 612 and 613 are drawn in the second screen 320. The object 612 is composed of a circle and an arrow, and drawn so as to point at the object 611. Namely, the application window 600 or the object 611 is associated with the object 612. On the other, the object 613 is located apart from the application window 600, and impertinent to the application window 600.

Figure 7:
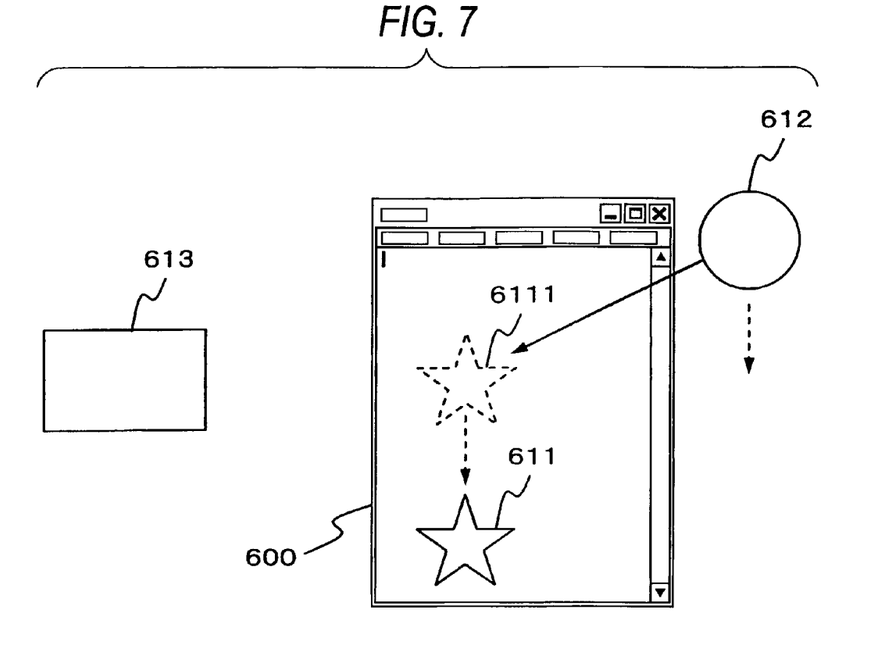
FIG. 7 is an explanatory diagram showing a processing example in the embodiment.

FIG. 7 shows an example in case that the object 611 drawn in the fixed application window 600 has moved two-dimensionally (for example, scrolled) in the application window 600. Namely, in a state where the application window 600 itself does not move and what is located outside the application window 600 does not also move, the object 611 in the application window 600 has scrolled from a position of an object 6111 to a position of the object 611. In this case, the object 612 associated with the object 611 should be also moved, following the movement of the object 611. However, an object 613 should not be moved.

Figure 8:
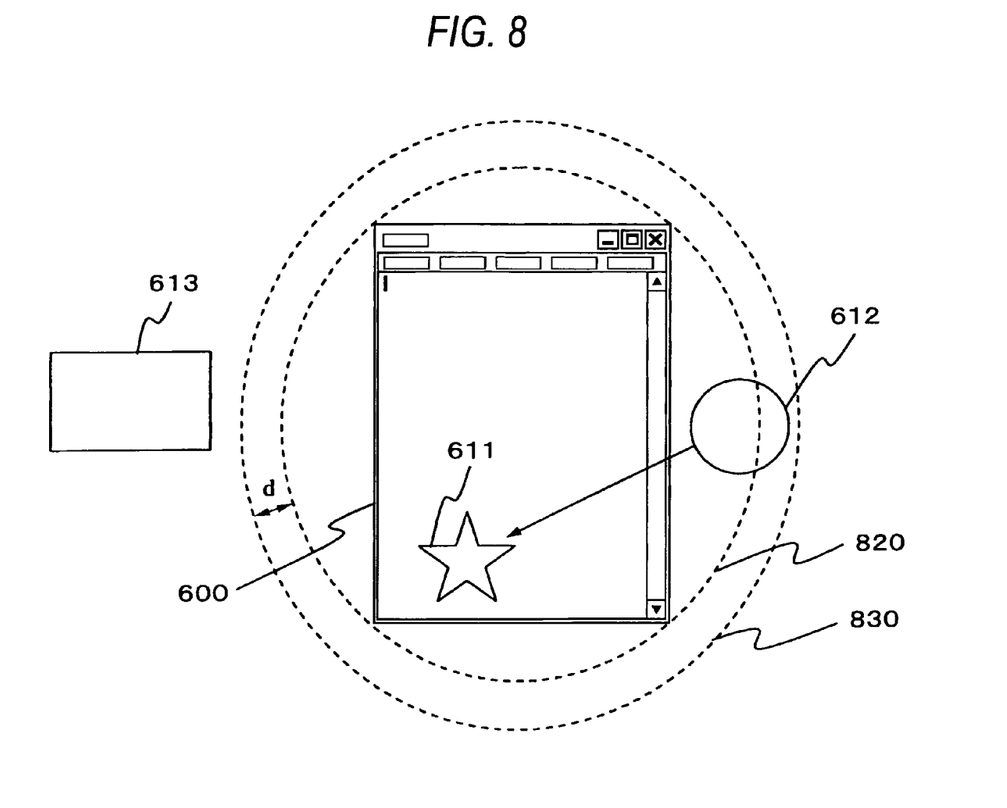
FIG. 8 is an explanatory diagram showing a processing example in the embodiment.

FIG. 8 shows an example in case that the object 612 moves following the movement of the object 611. Namely, in case that the position of the object 611 managed by the OS is changed, the position of the object 612 in the second screen 320 is changed following the change in position of the object 611. The object 613 does not move.

In this example, a subject of movement is an object which is drawn in a concentric ellipse 830 on the second screen 320. The concentric ellipse 830 is larger by d than an ellipse 820 circumscribing the application window 600. Accordingly, though the object 612 is the subject of movement, the object 613 is not the subject of movement.

Figure 4:
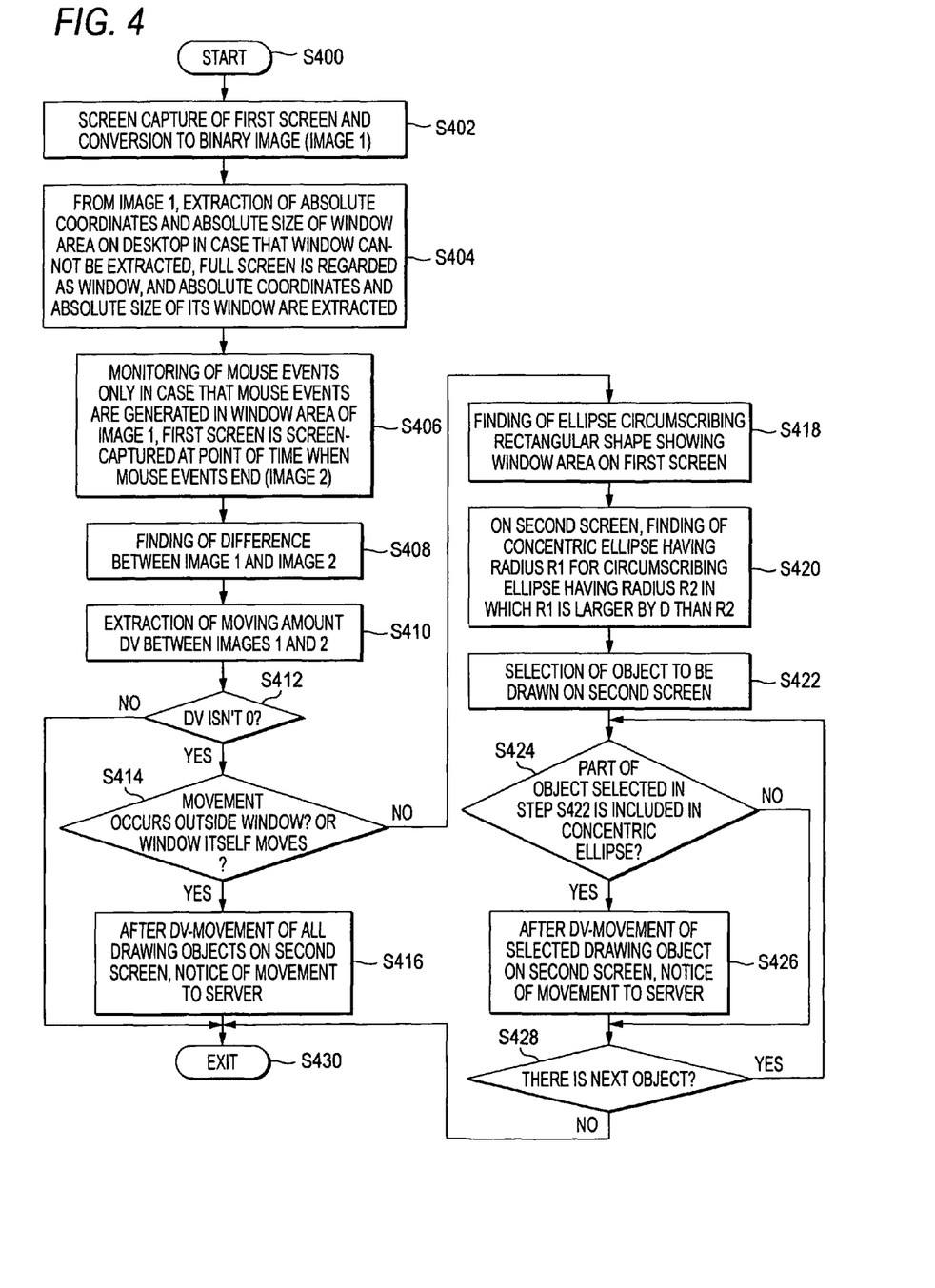
FIG. 4 is a flowchart showing a processing example in the embodiment.

Examples of processing which realize such the operations described with reference to FIGS. 6 to 8 are shown in the flowchart of FIG. 4.

In a step S402, the screen capture module 113 takes screen capture of the first screen 310 and binarizes its image on the first screen 310 thereby to generate a binary image (hereinafter, this binary image is referred to as an image 1).

In a step S404, the moving area determining module 112 extracts, from the image 1, absolute coordinates and absolute size of the window area in the first screen 310. At this time, in case that the window cannot be extracted, a full screen is regarded as a window, and absolute coordinates and absolute size of its window are extracted.

In a step S406, the moving area determining module 112 monitors mouse events. Only in case that mouse events are generated in the window area of the image 1, the moving area determining module 112 gives such an instruction to the screen capture module 113 as to take screen capture of the first screen 310 at the point of time when the mouse events end. Thereafter, similarly to the operation in the step S402, the screen capture module 113 takes screen capture of the first screen 310 and binarizes its image on the first screen 310 to generate a binary image (hereinafter, this binary image is referred to as an image 2).

In a step S408, the moving area determining module 112 finds difference between the image 1 and the image 2.

In a step S410, the moving area determining module 112 extracts, from the difference obtained in the step S408, the moving amount Dv between the images 1 and 2.

In a step S412, the moving area determining module 112 determines whether Dv is not zero. Namely, the moving area determining module 112 determines whether change exists in the first screen 310. In case of YES in such the determination (In case that change exists), the processing proceeds to a step S414. In another case (In case that change does not exist), the processing ends (step S430).

In the step S414, the moving area determining module 112 determines whether the movement of object occurs outside the window, or whether the window itself moves. In case of YES in such the determination, the processing proceeds to a step S416; and in another case (in case that change exists inside the window), the processing proceeds to a step S418.

In the step S416, the drawing object coordinate correcting module 114 moves all the drawing objects on the second screen 320 by Dv. Thereafter, the data transmission/reception module 116 notifies the server 120 of the movement.

In processing in steps S418 to S428, objects associated with the window in the first screen 310 (object in the second screen 320) are founded. This processing will be described with reference to FIG. 5.

Figure 5:
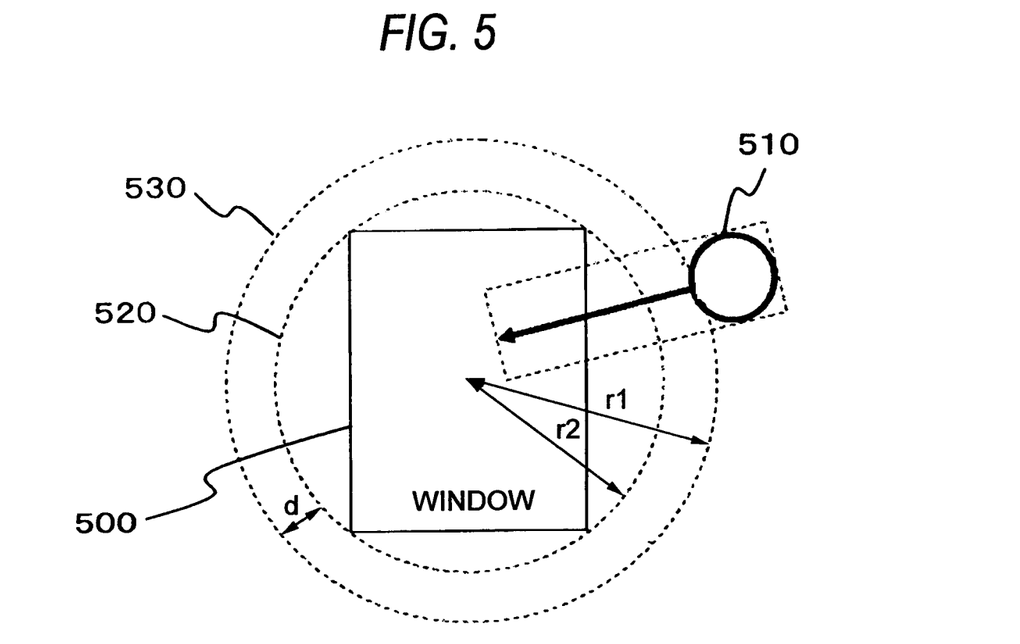
FIG. 5 is an explanatory diagram showing association between a window and an object.

In a step S418, the drawing object acquirement module 111 finds an ellipse 520 (including a circle) circumscribing a rectangular shape showing the area of the window 500 on the first screen 310. Namely, with a center of the window 500 as a center of the ellipse, such the circumscribing ellipse 520 as to surround the window 500 is found.

In a step S420, the drawing object acquirement module 111 finds, on the second screen 320, a concentric ellipse 530 in which a previously set d is added to the circumscribing ellipse 520. Namely, the concentric ellipse 530 that has a center in the same position as the position of a center of the circumscribing ellipse 520 and is larger by d than the ellipse 520 is found.

In a step S422, the drawing object acquirement module 111 selects one object drawn on the second screen 320. In case of FIG. 5, an object 510 is selected.

In a step S424, the drawing object acquirement module 111 determines whether or not a part of the object 510 selected in the step S422 is included in the area of the concentric ellipse 530. In case of YES (In case that the object exists near the window) in such the determination, the processing proceeds to a step S426; and in another case (in case that the object does not exist near the window), the processing proceeds to a step S428. In case of FIG. 5, since the object 510 is included in the concentric ellipse 530, a result of the determination is YES.

In the step S426, the drawing object coordinate correcting module 114 moves the selected drawing object on the second screen 320 by Dv. Thereafter, the data transmission/reception module 116 notifies the server 120 of the movement.

In a step S428, the drawing object acquirement module 111 determines whether or not a next object exists. In case of YES (In case that the remaining objects exist) in such the determination, the processing returns to the step S424; and in another case (in case that other object to be determined do not exist), the processing ends (step S430).

Figure 9:
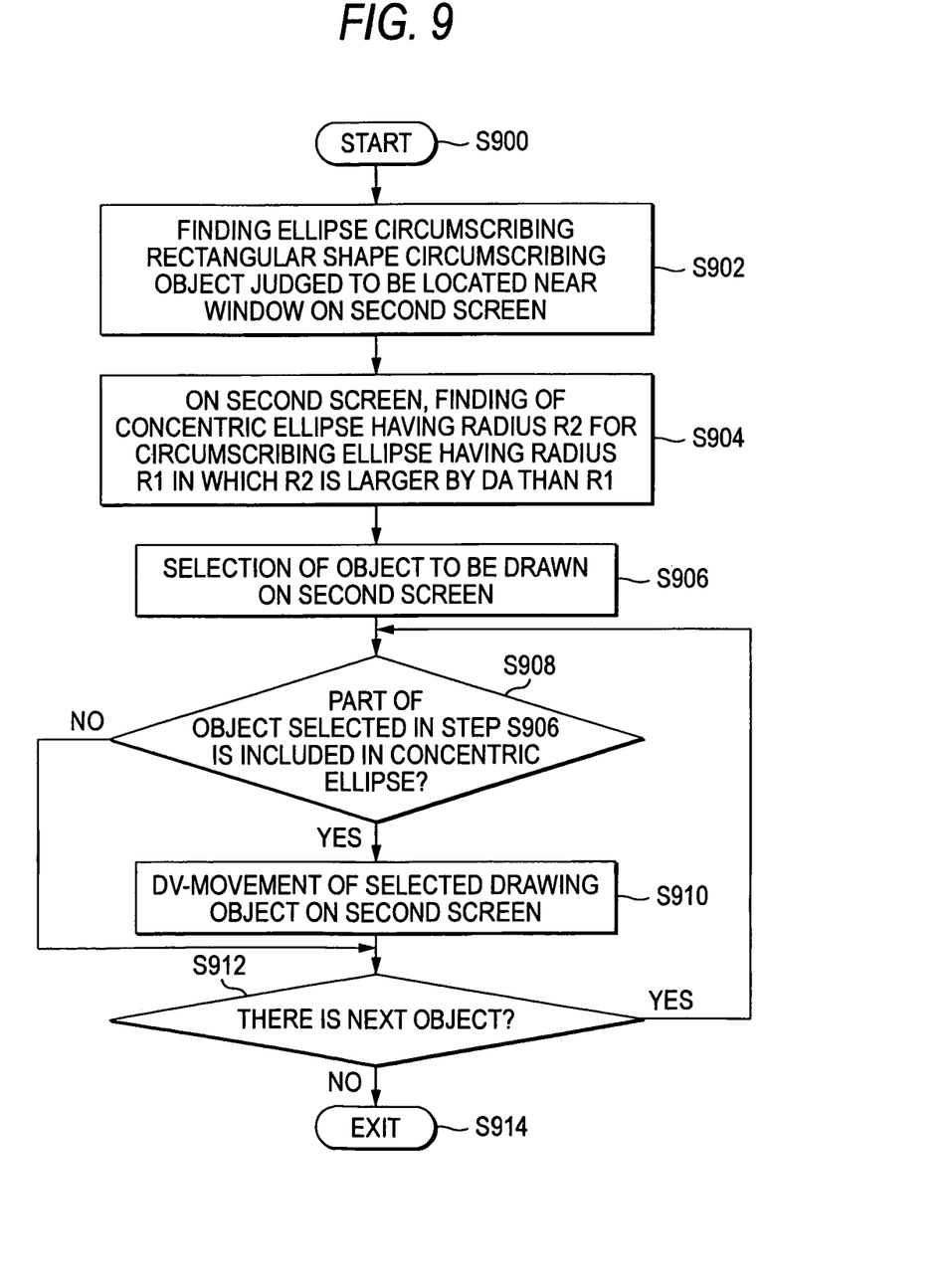
FIG. 9 is a flowchart showing a processing example for acquiring an object existing near the acquired object.

With reference to a flowchart shown in FIG. 9, an example of processing for acquiring further an object near the object acquired by the drawing object acquirement module 111 will be described.

Figure 10:
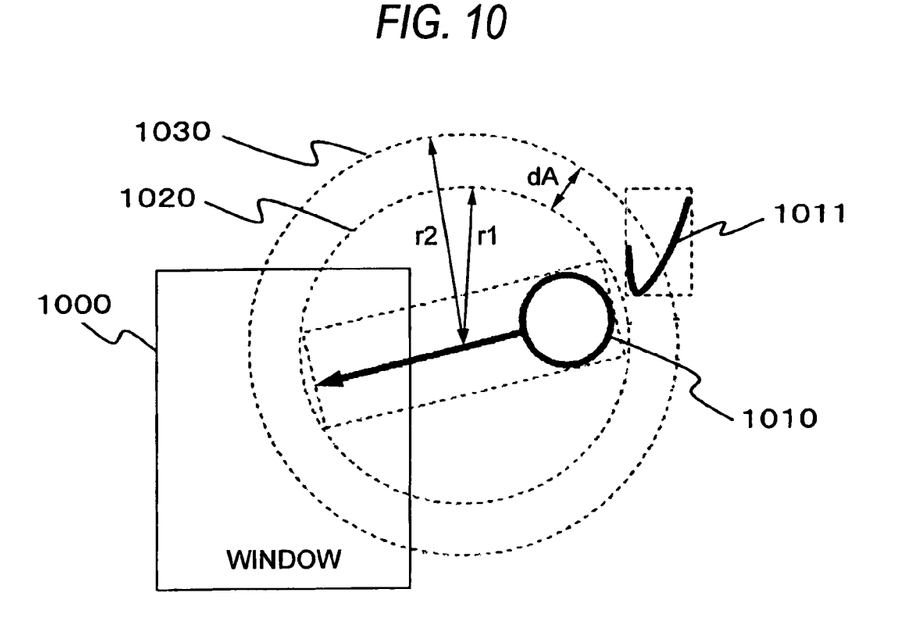
FIG. 10 is an explanatory diagram showing a relation between the acquired object and an object existing near its object.

First, the concrete processing example will be described with reference to FIG. 10.

An object 1010 that is concerned with a window 1000 in the first screen 310 can be selected based on the processing by the flowchart shown in FIG. 4. On the other, though an object 1011 is near the object 1010, the object 1011 is determined not to be associated with the window 1000, and is not moved in the processing by the flowchart shown in FIG. 4. However, since the object 1011 is associated with the object 1010, it should move with the movement of the object 1010, and an example of processing for realizing its movement of the object 1010 is shown in the flowchart of FIG. 9.

In a step S902, the drawing object acquirement module 111 finds an ellipse 1020 circumscribing a rectangular shape circumscribing the object 1010 determined to be located near the window 1000 on the second screen 320.

In a step S904, the drawing object acquirement module 111 finds, on the second screen 320, a concentric ellipse 1030 in which a previously set dA is added to the circumscribing ellipse 1020. Namely, the concentric ellipse 1030 that has a center in the same position as the position of a center of the circumscribing ellipse 1020 and is larger by dA than the ellipse 1020 is found.

In a step S906, the drawing object acquirement module 111 selects one object drawn on the second screen 320. In case of FIG. 10, an object 1011 is selected.

In a step S908, the drawing object acquirement module 111 determines whether or not a part of the object 1011 selected in the step S906 is included in the area of the concentric ellipse 1030. In case of YES (In case that an object exists near the object) in such the determination, the processing proceeds to a step S910; and in another case (in case that an object does not exist near the object), the processing proceeds to a step S912. In case of FIG. 10, since the object 1011 is included in the concentric ellipse 1030, a result of the determination is YES.

In the step S910, the drawing object coordinate correcting module 114 moves the selected drawing object on the second screen 320 by Dv. Thereafter, the data transmission/reception module 116 notifies the server 120 of its movement.

In the step S912, the drawing object acquirement module 111 determinations whether or not a next object exists. In case of YES (In case that the remaining objects exist) in such the determination, the processing returns to the step S908; and in another case (in case that other objects to be determined do not exist), the processing ends (step S914).

Figure 11:
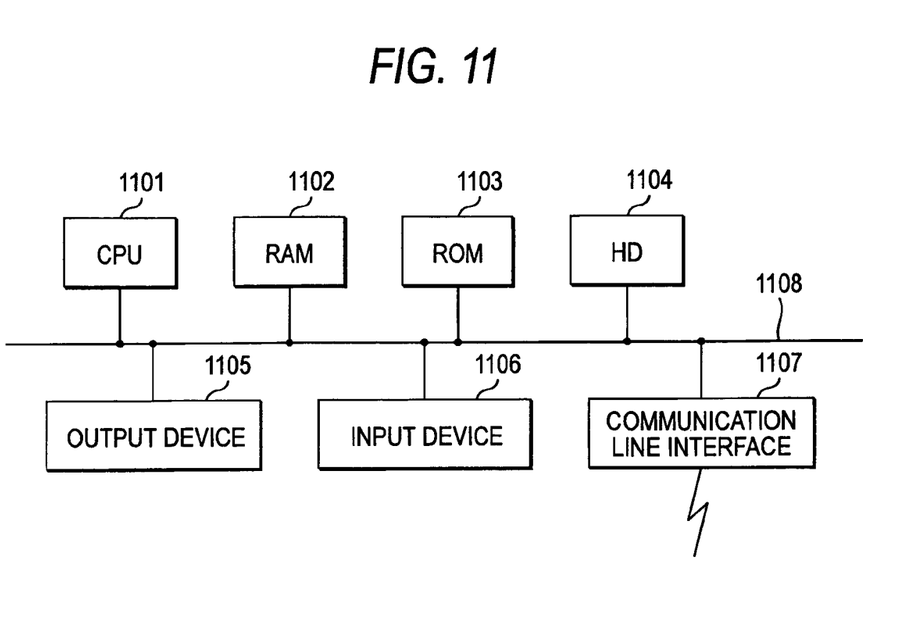
FIG. 11 is a block diagram showing a hardware configuration example of a computer which implements the embodiment.

A computer (the host computer PC110, the server 120, the client 130A, or the like) by which the program in the embodiment is executed is, as shown in FIG. 11, on its hardware configuration, a general computer; and specifically a computer that can become a personal computer or a server. This computer includes a CPU 1101 which executes programs such as the drawing object acquirement module 111, the moving area determining module 112, the screen capture module 113, the drawing object coordinate correcting module 114, the module for superimposition drawing 115, the connection management module 122, the data management module 123, the module for superimposition drawing 132A, and the drawing object acquirement module 133A; a RAM 1102 which stores their programs and data; a ROM 1103 which stores a program for starting this computer; a HD 1104 that is an auxiliary storage device (for example, a hard disc); an input device 1106 such as a keyboard and a mouse which inputs data; an output device 1105 such as a CRT or a liquid crystal display; a communication line interface 1107 (for example, a network interface card) for connecting to a communication network; and a bus 1108 which connects their parts to transmit and receive data among them. A plurality of these computers may be connected to each other via the network.

Regarding a computer program of the aforesaid embodiment, a system having this hardware configuration is caused to load the computer program that is the software, and the software resource and the hardware resource cooperate with each other thereby to implement the aforesaid embodiment.

The hardware configuration shown in FIG. 11 shows one example of the configuration, and the embodiment is not limited to the configuration shown in FIG. 11, but any configuration may be used as long as it can execute the modules described in the embodiment. For example, a part of modules may be configured by dedicated hardware (for example, ASIC), a part of modules may be in an external system as long as it is connected to other modules via the communication line, and further a plurality of systems shown in FIG. 11 may be connected to each other via the communication line so as to cooperate with each other. Further, in addition to a personal computer, this system may be incorporated in an information appliance, a copying machine, a facsimile, a scanner, a printer, and a multifunctional machine (image processing apparatus having any two or more functions of a scanner, a printer, a copying machine, a facsimile, and the like).

In the embodiment, in case that an object in the second screen 320 which is associated with the object in the first screen 310 is selected, the example using the circumscribing ellipse and the concentric ellipse has been described. However, an object in the second screen 320 which exists within a predetermined distance from the outer circumference of the object in the first screen 310 may be selected.

Further, in the embodiment, though movement is indicated as a change example of the first object, enlargement, reduction, deformation, or deletion may be used. In case of the enlargement, the reduction, or the deformation, in accordance with magnification or deformation processing for the first object, the second object (including the third object) is enlarged, reduced, or deformed. Further, in case of deletion, the second object is also deleted.

Further, the above-described program may be provided in a storage form in a recording medium, or its program may be provided by a communication means. In this case, the above-described program may be grasped as an invention of a "computer readable recording medium storing a program".

The "computer readable recording medium storing a program" means a recording medium which can read data by a computer, is used for installation, execution, and distribution of a program, and stores therein a program.

The recording medium is, for example, a digital versatile disc (DVD), in which there are [DVD-R, DVD-RW, DVD-RAM, and the like] formulated by DVD Forum, [DVD+R, DVD+RW, and the like] formulated by DVD+RW, and a compact disc (CD). Specifically, there are a read-only memory (CD-ROM), a CD recordable (CD-R), a CD rewritable (CD-RW), a magneto-optical disc (MO), a flexible disc (FD), a magnetic tape, a hard disk, a read-only memory (ROM), an electrically erasable and programmable read-only memory (EEPROM), a flash memory, a random access memory (RAM), and the like.

Further, the program or its part may be stored in the recording medium to be retained or distributed. Further, the program or its part may be transmitted by means of communication such as a wire network used in a local area network (LAN), a metropolitan area network (MAN), a wide area network (WAN), Internet, an intranet and an extranet, or a wireless communication network; or by means of a transmission medium in combination of these networks. Furthermore, the program or its part may be carried by a carrier.

Further, the program may be a part of another program, or may be stored in the recording medium together with a separate program. Further, the program may be recorded in the plural recording mediums in a division manner. Further, the program may be stored in any form such as in a compression form or in encryption as long as it is recoverable.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing apparatus comprising:
a first object displaying unit that displays a first object on a first screen on a display device;
a second object displaying unit that displays a second object and a third object on a second screen on the display device, the second screen being superimposed on the first screen and being transparent, wherein at least a part of the second object overlaps the first object and a whole part of the third object does not overlap the first object;
a third object acquirement unit that determines if the third object is located within a predetermined distance from the second object by finding a concentric ellipse around the second object that is larger by the predetermined distance than an ellipse circumscribing the second object and acquires the third object if it is determined that the third object is located within the predetermined distance from the second object;
a first and second object acquirement unit that acquires the first object displayed on the first screen and the second object displayed on the second screen;
a movement determining unit that determines a moving amount of the first object displayed on the first screen;
a change unit that relocates the second objects on the second screen by the moving amount and, if the third object is acquired by the third object acquirement unit, relocates the third object on the second screen by the moving amount; and
a transmission unit that transmits information regarding the second object, the third object, and the moving amount.

2. An information processing apparatus comprising:
a reception unit that receives the information regarding the second object, the third object, and the moving amount from the information processing apparatus according to claim 1;
a first drawing unit that draws the image on the basis of the information received by the reception unit on a first screen;
a second drawing unit that performs drawing on a second screen on the basis of the information received by the reception unit;
a display unit that displays the first screen on which drawing is performed by the first drawing unit and the second screen on which drawing is performed by the second drawing unit in a superposition state;
an object acquirement unit that acquires an object displayed on the second screen; and
a transmission unit that, in case that the object acquired by the object acquirement unit is changed, transmits information on the changed object to another information processing apparatus.

3. The information processing apparatus as claimed in claim 1, wherein the first and second object acquirement unit acquires the second object associated with the first object based on a distance between the first object and the second object.

4. The information processing apparatus as claimed in claim 1, wherein
the apparatus determines if the third object is located within a predetermined distance of the second object by:
determining whether at least a part of the third object is within the concentric ellipse.

5. A non-transitory computer readable recording medium storing a program causing a computer to execute a process for performing an information processing, the process comprising:
displaying a first object on a first screen on a display device; acquiring an image displayed on the first screen;
displaying a second object and a third object on a second screen of the display device, the second screen being superimposed on the first screen and being transparent, wherein at least a part of the second object overlaps the first object and a whole part of the third object does not overlap the first object;
determining if the third object is located within a predetermined distance from the second object by finding a concentric ellipse around the second object that is larger by the predetermined distance than an ellipse circumscribing the second object;
acquiring the third object if it is determined that the third object is located within the predetermined distance from the second object;
acquiring the first object displayed on the first screen and the second object displayed on the second screen;
determining a moving amount of the first object displayed on the first screen;
relocating the second object on the second screen by the moving amount, if the third object is acquired, relocating the third object on the second screen by the moving amount; and
transmitting information regarding the second object, the third object, and the moving amount.

6. A non-transitory computer readable recording medium storing a program causing a computer to execute a process for performing an information processing, the process comprising:
receiving the information regarding the second object, the third object, and the moving amount from the computer according to claim 5; drawing the image on a first screen; drawing on a second screen on the basis of the information received; displaying the first screen on which drawing has been performed and the second screen on which drawing has been performed in a superposition state; acquiring an object displayed on the second screen; and
in case that the object acquired has been changed, transmitting information on the changed object to another information processing apparatus.

7. The non-transitory computer readable recording medium as claimed in claim 5, wherein determining if the third object is located within a predetermined distance of the second object comprises:

determing whether at least a part of the third object is within the concentric ellipse.

\* \* \* \* \*